Aug. 4, 1959          C. BYRD          2,897,643

APPARATUS FOR APPLYING CLOSURES TO FLEXIBLE CONTAINERS

Filed March 29, 1956          10 Sheets-Sheet 1

INVENTOR.
*Carl Byrd.*
BY *Joseph B. Lindecker.*
*Attorney.*

Aug. 4, 1959     C. BYRD     2,897,643
APPARATUS FOR APPLYING CLOSURES TO FLEXIBLE CONTAINERS
Filed March 29, 1956     10 Sheets-Sheet 2

INVENTOR.
Carl Byrd.
BY
Joseph B. Lindecker.
Attorney.

INVENTOR.
Carl Byrd.
BY Joseph B. Lindecker
Attorney.

Aug. 4, 1959  C. BYRD  2,897,643
APPARATUS FOR APPLYING CLOSURES TO FLEXIBLE CONTAINERS
Filed March 29, 1956  10 Sheets-Sheet 4
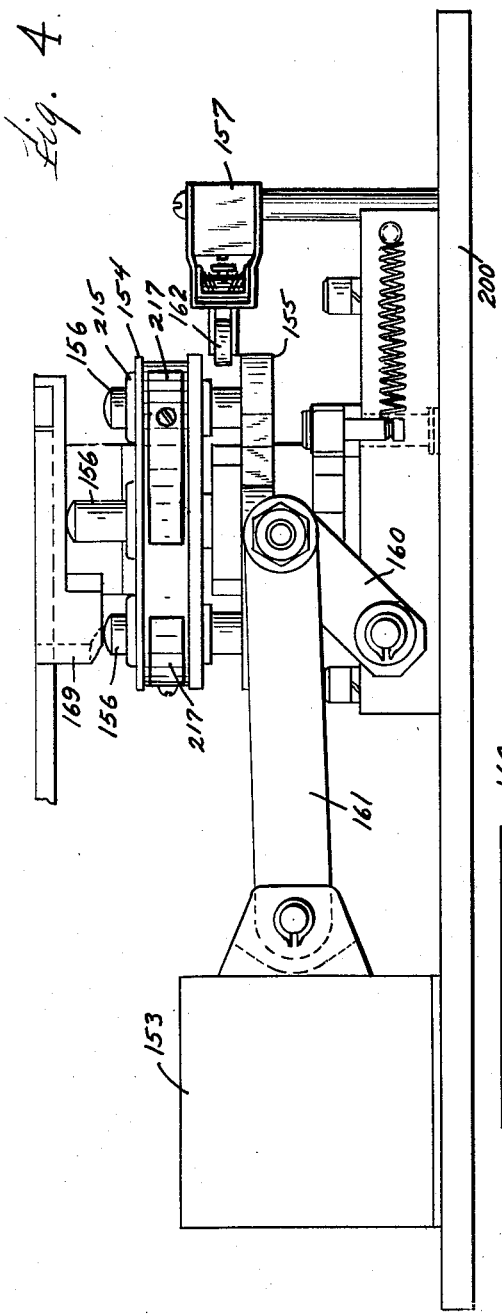
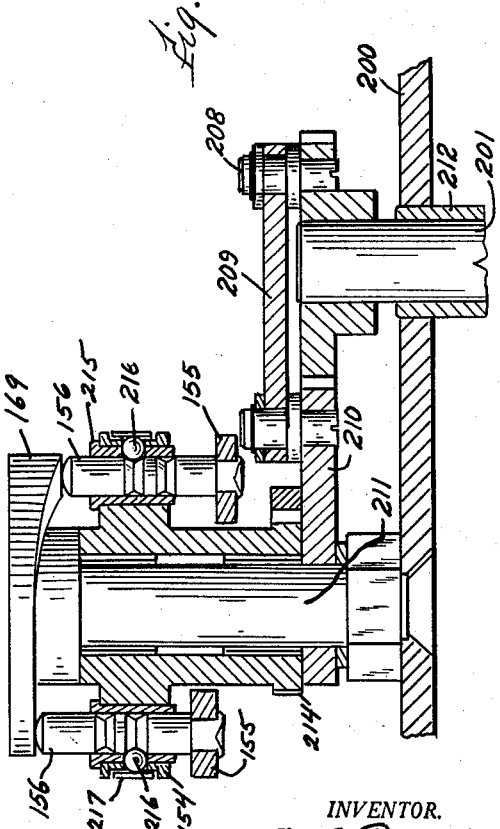
INVENTOR.
Carl Byrd.
BY
Joseph B. Lindecker
Attorney.

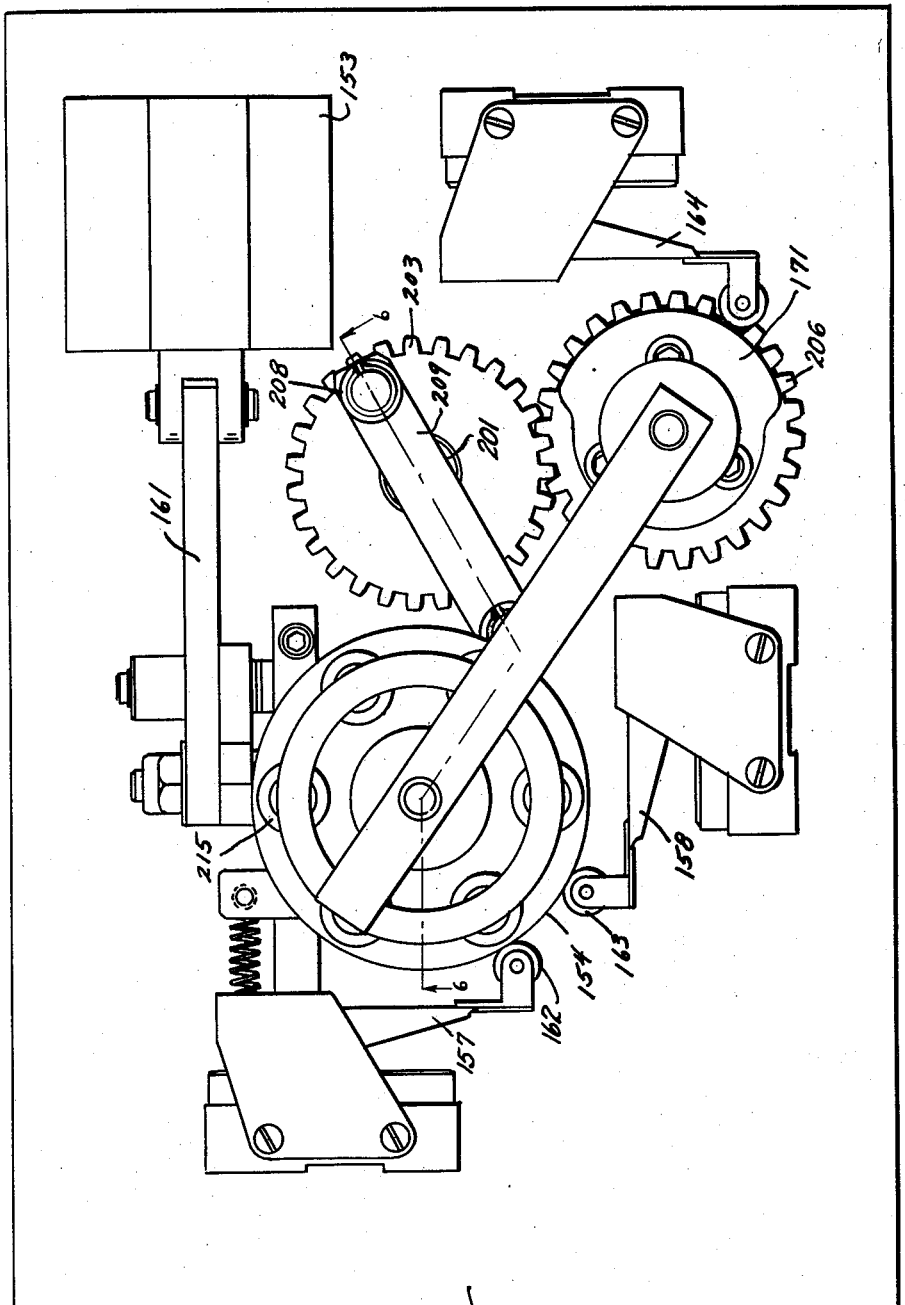

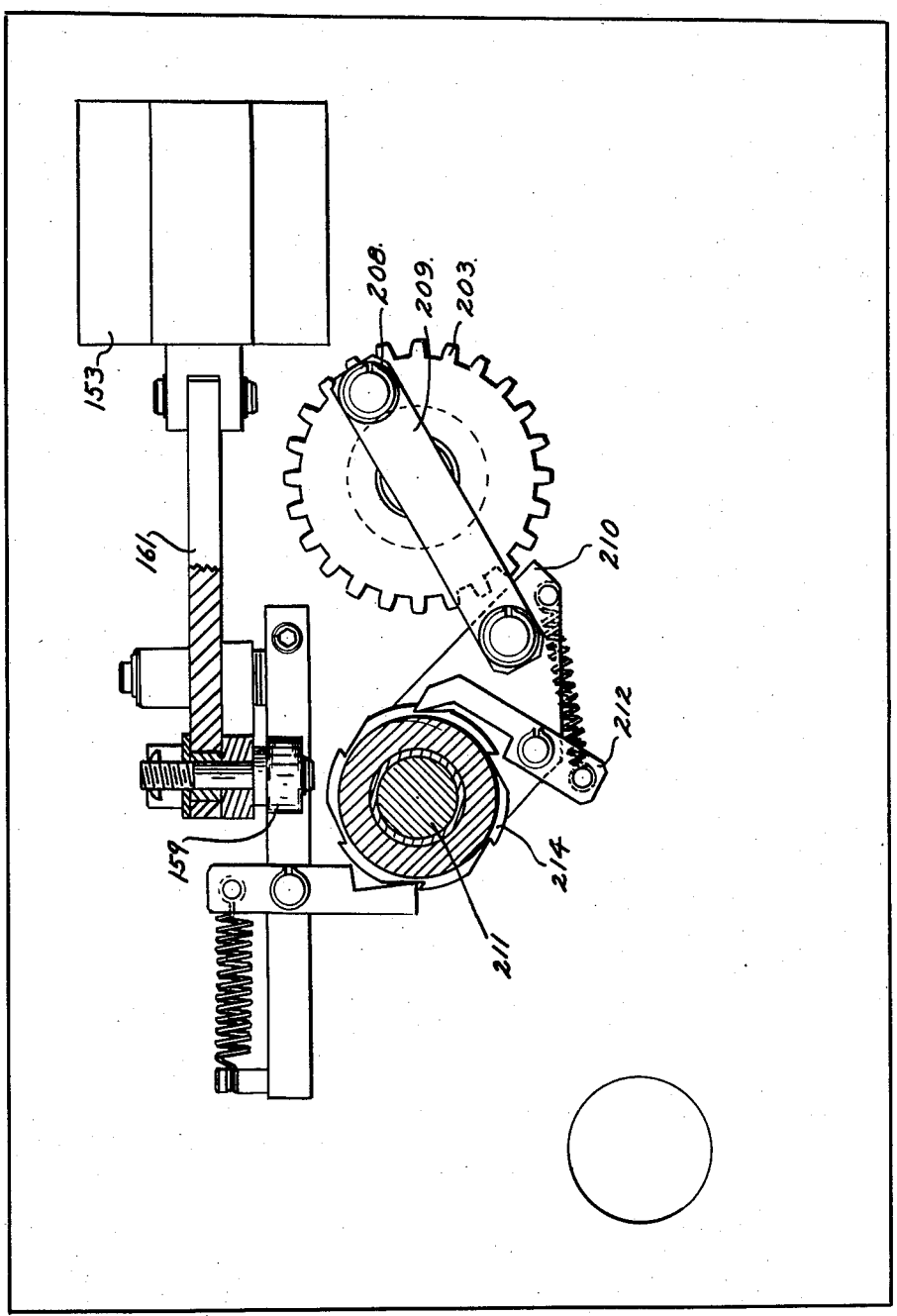

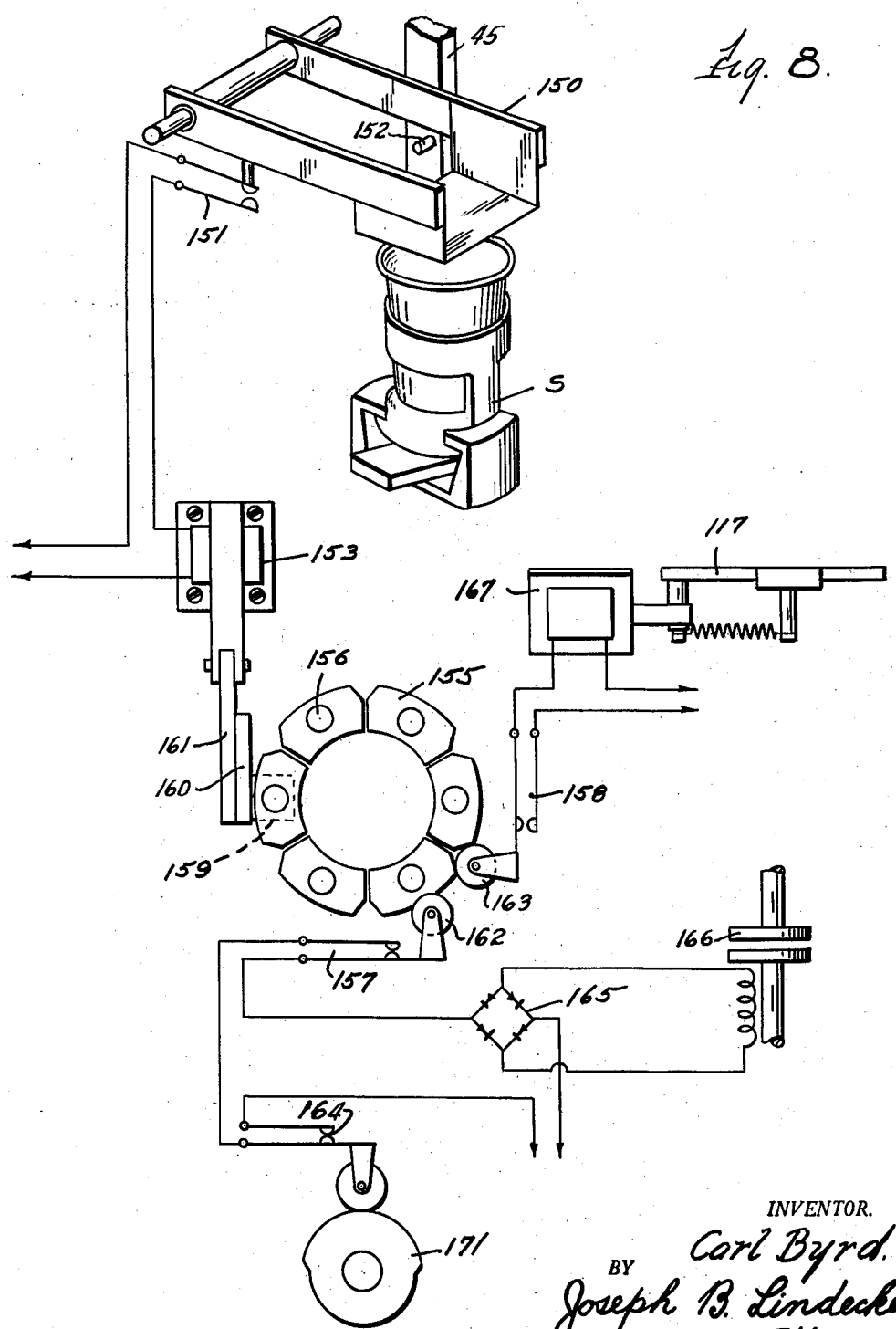

Aug. 4, 1959 C. BYRD 2,897,643
APPARATUS FOR APPLYING CLOSURES TO FLEXIBLE CONTAINERS
Filed March 29, 1956 10 Sheets-Sheet 8
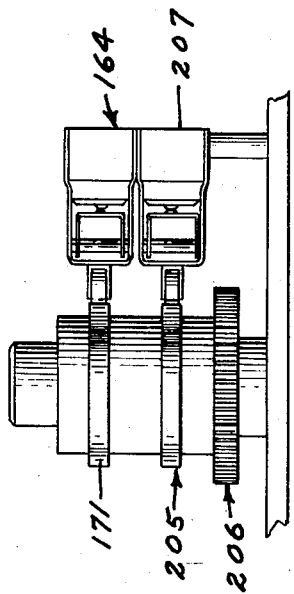
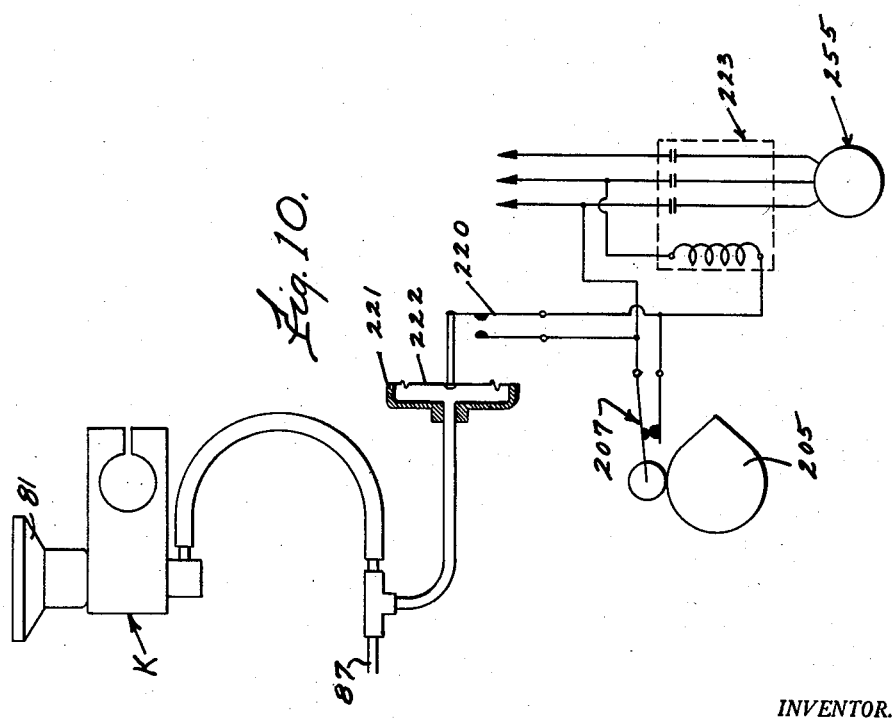
INVENTOR.
Carl Byrd.
BY
Joseph B. Lindecker.
Attorney.

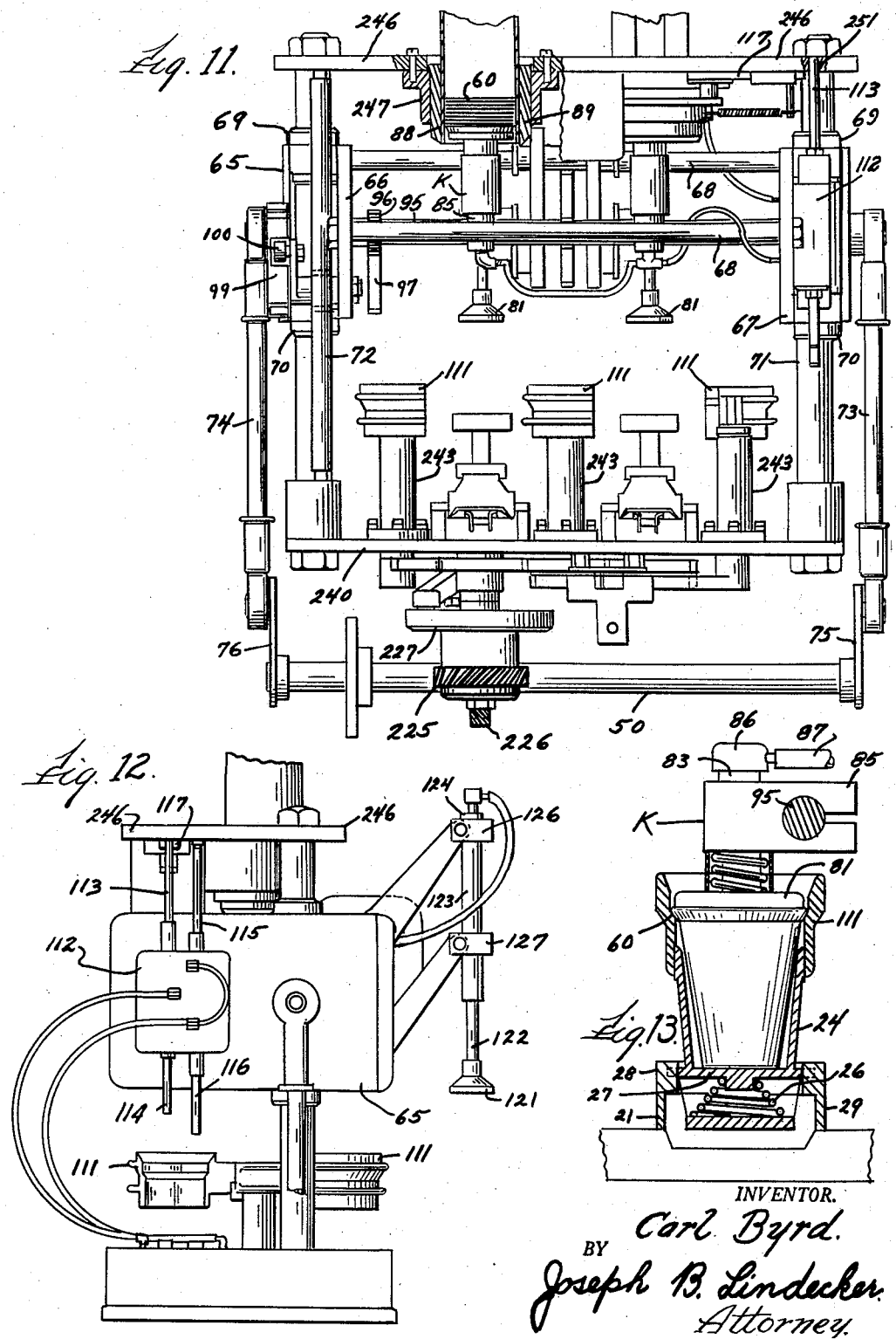

Aug. 4, 1959
C. BYRD
2,897,643
APPARATUS FOR APPLYING CLOSURES TO FLEXIBLE CONTAINERS
Filed March 29, 1956
10 Sheets-Sheet 10
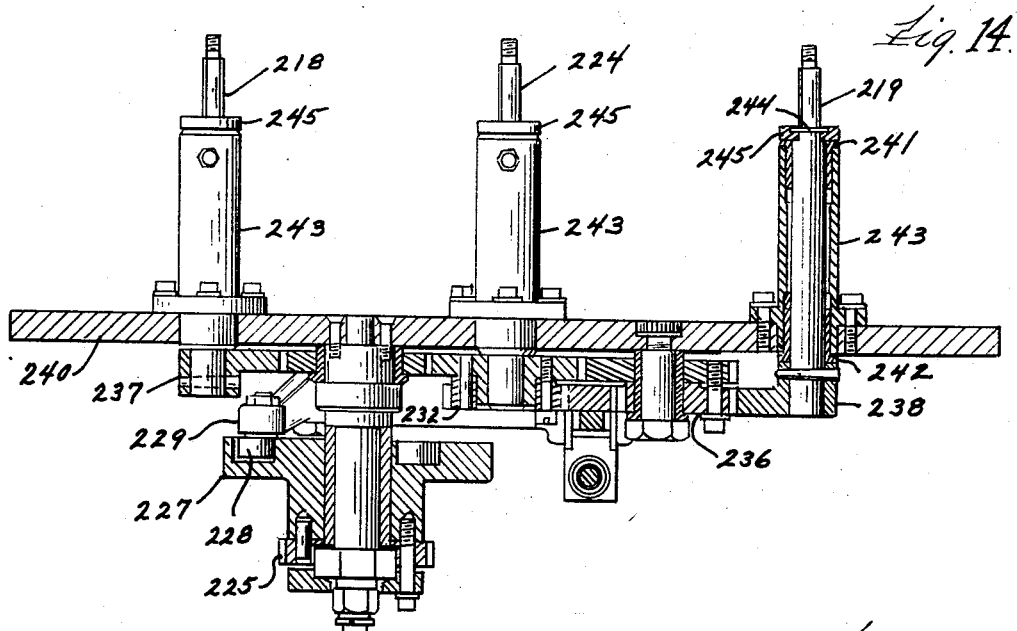
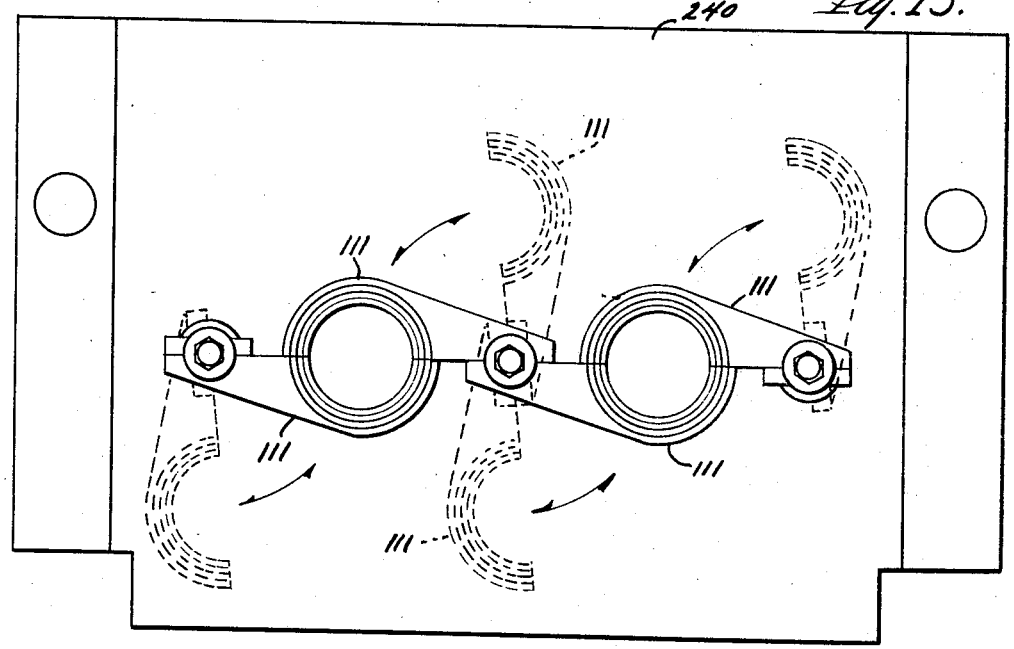
INVENTOR.
Carl Byrd.
BY
Joseph B. Lindecker.
Attorney.

United States Patent Office 2,897,643
Patented Aug. 4, 1959

2,897,643

APPARATUS FOR APPLYING CLOSURES TO FLEXIBLE CONTAINERS

Carl Byrd, Chicago, Ill., assignor to Standard Packaging Corporation, Chicago, Ill., a corporation of Virginia Application March 29, 1956, Serial No. 574,768

23 Claims. (Cl. 53—59)

This application is a continuation-in-part of my copending application, Serial No. 541,344, filed October 19, 1955.

The invention relates to a machine wherein empty containers are fed to a filling apparatus, the filling apparatus is rendered operative to discharge a quantity of a substance into the containers, and the filled containers are then advanced to a mechanism which applies lids or closures thereto.

More particularly, the present invention relates to a safety control system for machines of that general organization. This safety control system is effective to render inoperative the filling apparatus for a given cycle of operation, and to render inoperative the lid or closure-applying mechanism for a given cycle of operation, in the event a container is not presented thereto during the respective cycles of operation thereof. In addition, the safety control system of the present invention is effective to render inoperative the closure-applying mechanism in the event that the mechanism is unable to apply a lid or closure to a container.

In the preferred embodiment of the present invention, empty containers are released from a dispenser and transported by a moving conveyor to the filling apparatus in timed relation with the operation of the filling apparatus. The filling apparatus is then rendered operative to discharge a quantity of a substance into the empty container. Obviously if, during a given cycle of operation of the filling apparatus, an empty container is not presented thereto, it would be undesirable to render the filling apparatus operative. The operation of the filling apparatus in such instance would not only result in a wasteful loss of the substance but, in addition, might require stoppage of the machine for purposes of cleaning.

After the filling operation, the filled containers are transported by the conveyor to a closure-applying mechanism for the application of a lid or closure thereto. In the closure-applying mechanism, a reciprocating vacuum-type head withdraws a lid or closure from a storage hopper and applies it to the filled container under pressure to insure an interlocking action between the closure and the container. It is, of course, undesirable to operate the closure-applying mechanism to release a lid or closure during cycles in which a container is not presented thereto. Furthermore, in the event that the vacuum-type head does not effect the withdrawal of a lid or closure from the hopper, it would obviously be undesirable to bring the vacuum-type head into contact with the substance in the container because the substance might be drawn into the vacuum system of the machine.

It is an object of the present invention, therefore, to provide a safety control system which eliminates the aforementioned disadvantages, and at the same time to provide a system of self-inspection for a fully automatic machine of the type described above capable of operation at high speed.

Another object of the invention is to provide a machine of that type which embodies a safety control system designed to detect the absence of containers from predetermined positions on the conveyor and to make the filling apparatus and closure-applying mechanism inoperative during cycles of their operation when such positions of the conveyor are presented to them without containers.

Another object of the invention is to provide a safety control system to detect the absence or improper position of a lid or closure on the suction head of the closure-applying mechanism to prevent the substance within the container from being drawn into the vacuum system of the machine.

These and other objects and features of the present invention will be apparent from a consideration of the detailed description which follows and by reference to the accompanying drawings in which:

Figure 4 is a side elevational view of certain of the safety control mechanism, other portions of the machine being removed for sake of illustration;

Figure 5 is a front elevational view of the safety control mechanism shown in Figure 4;

Figure 6 is a sectional view taken generally along the line 6—6 of Figure 5;

Figure 7 is a front elevational view, partly in cross-section, of the mechanism shown in Figure 5;

Figure 8 is a schematic diagram of the elements of the safety control system for preventing the operation of the filling apparatus and the closure-applying mechanism during cycles in which no container is presented thereto;

Figure 9 is an enlarged, side elevational view of certain of the mechanism shown in Figure 5;

Figure 10 is a schematic diagram of the elements of the safety control system for preventing the completion of the closure-applying cycle of operation in case the suction head fails to receive a closure during its cycle of operation;

Figure 11 is a detailed fragmentary side elevation of the machine, with some parts in section;

Figure 12 is a detailed fragmentary front elevation of certain of the mechanism shown in Figure 11;

Figure 13 is a detailed fragmentary sectional view illustrating the operation of the closure-applying mechanism;

Figure 14 is a detailed fragmentary elevation view, partly in cross-section, illustrating the mechanism for opening and closing the sealing-rings; it is a view taken substantially along the line 14—14 of Figure 16;

Figure 15 is a plan view of the mechanism shown in Figure 14;

Figure 1:
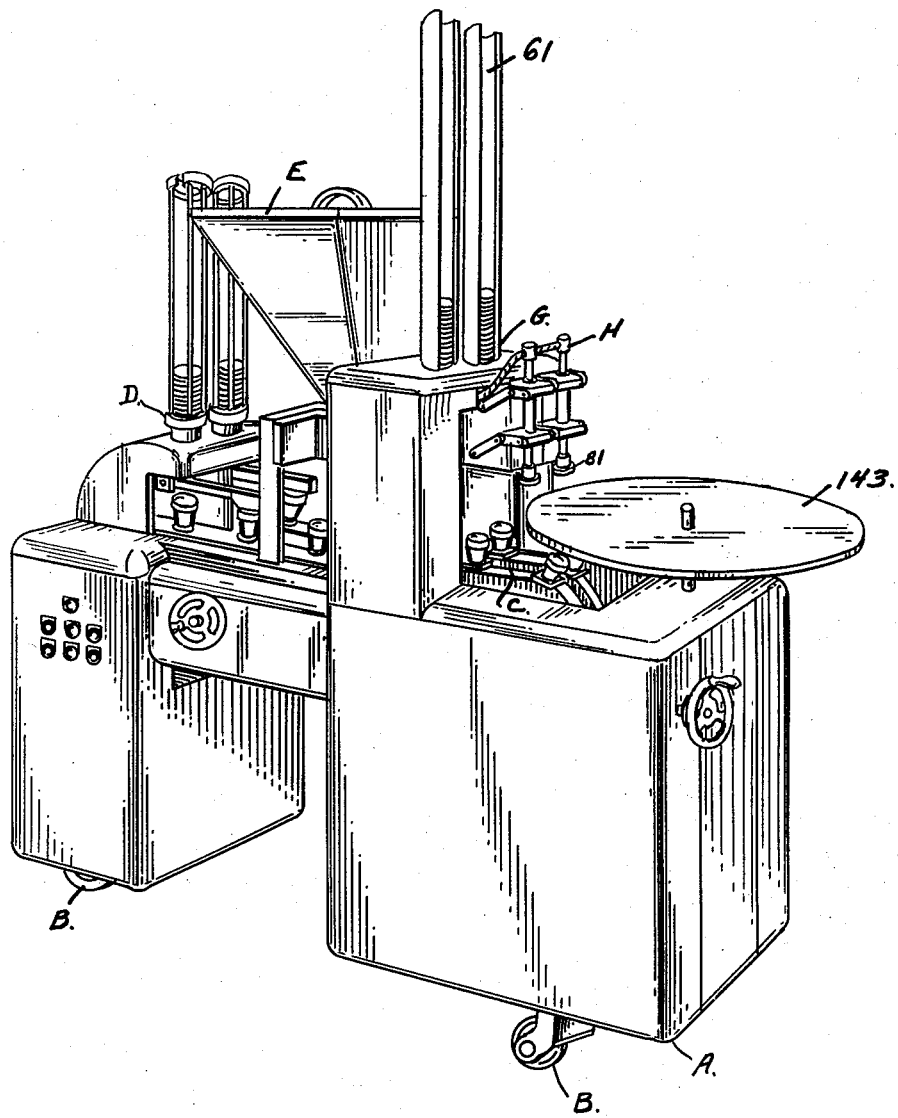
Figure 1 is a front perspective view of a filling and closure-applying machine embodying the present invention.

The subject matter of the present invention, as shown and described herein, is particularly applicable, but by no means limited, to the packaging of sherbet in paper containers having a curved, or rolled, edge at the open end thereof which interlocks with the outer periphery of a paper-foil laminated closure or lid.

Referring to the drawings, the machine disclosed herein is mounted on a suitable framework A supported on a plurality of casters B to provide a mobile machine which may be conveniently moved from one position to another as desired. The machine comprises an endless conveyor C, a container dispenser D which releases empty containers onto the conveyor C, a hopper E for storing the sherbet in bulk, a container filling apparatus F which discharges measured quantities of the sherbet through nozzles M into the containers, a closure-applying mechanism G for applying lids or covers to the containers, and a container lifting mechanism H for lifting the closed containers of sherbet and delivering them to a rotatable receiving platform 143.

Figure 2:
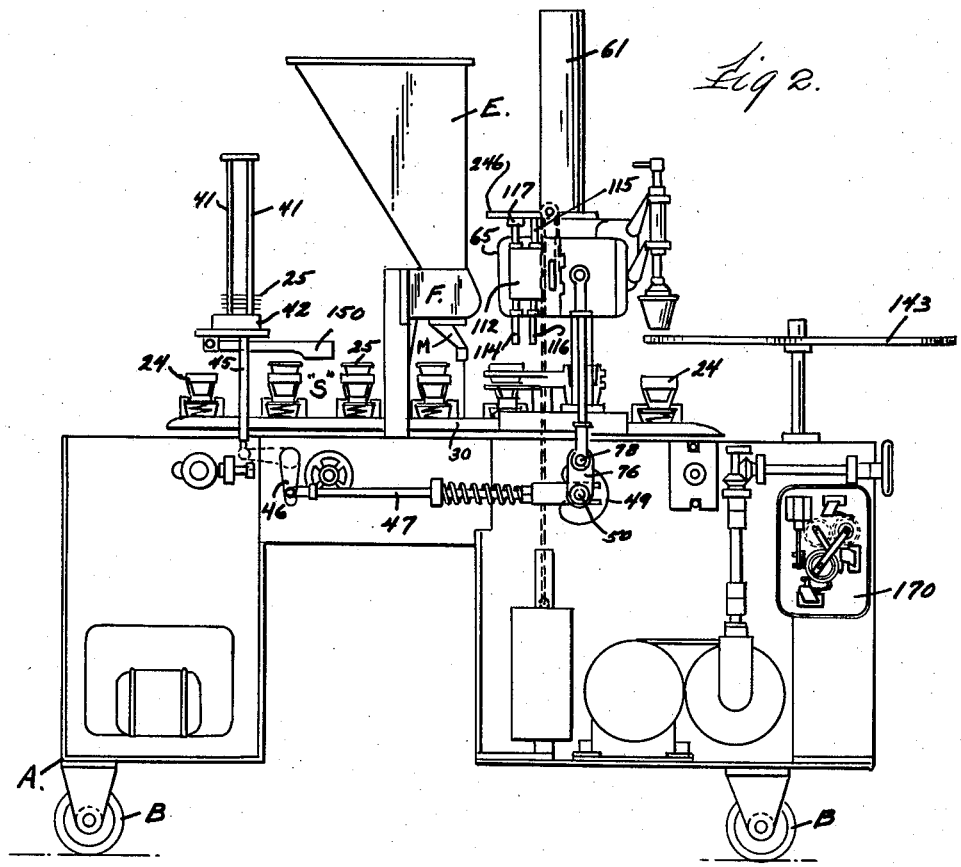
Figure 2 is a front elevational view of the machine shown in Figure 1, with portions omitted for sake of illustration.
Figure 3:
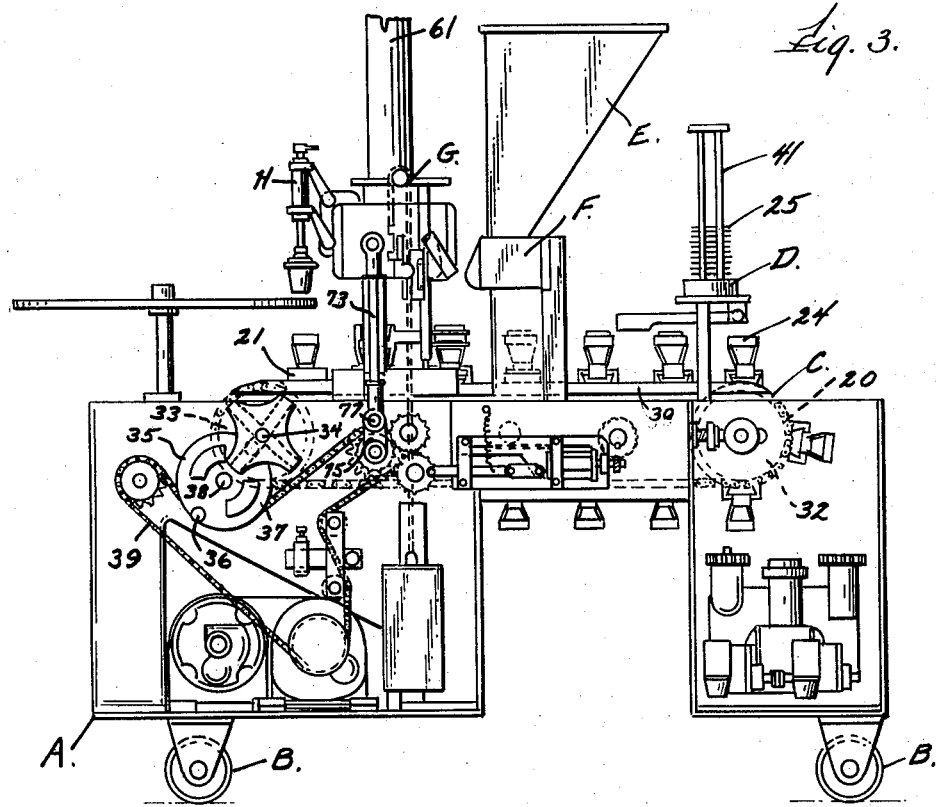
Figure 3 is a rear elevational view of the machine shown in Figure 1, with portions omitted for sake of illustration.

As shown in Figure 3, the conveyor C of this machine comprises a pair of endless chains 20, spaced transversely apart, each carrying a plurality of container receiving shells 24 at spaced intervals thereon. The shells 24 are each set into a base 28 and, as best shown in Figure 13, the base 28 is provided with legs 21 and 29 which are attached to the chain. The shells 24 are resiliently mounted to the bases 28 by compressed springs 26 accommodated within a recess of the base 28 and engaging the bottom 27 of the shell. The bases 28 of the shells 24 along the operative span of the chain 20 are guided in their movement by stationary transverse guides 30, shown in Figures 2 and 3.

The endless chain 20 of the conveyor C passes around two sprockets, an idler sprocket 32 and a driven sprocket 33. The driven sprocket 33 is pinned to a rotatable shaft 34, which, in turn, is driven intermittently by a Geneva mechanism 35 which comprises a rotatable wheel 37 supported on a shaft 38 and two driving rollers carried by the wheel 37. The wheel 37 is driven at a constant speed by a chain drive 39, and the rollers, one at a time, engage crossed slots formed in a disk mounted on the shaft 34, thereby providing an intermittent drive for the conveyor chain 20. This Geneva mechanism 35 causes the conveyor to move a distance equal to the distance between the shells 24 for each one-half revolution of the wheel 37 and provides a dwell between each movement imparted to the chain.

Each of the container dispensers D of the machine comprises four vertical shafts 41 forming a magazine upstanding from a conventional dispenser housing 42. The operation of the dispenser to effect the release of a container 25 therefrom is controlled by a rotatable cam 49 (see Figure 2) by a mechanical linkage which includes a vertically disposed actuator 45, a connecting rod 47, a pivotal bellcrank lever 46 connecting the rod 47 and the actuator 45, and a spring-urged cam follower (not shown) engaging the surface of the cam 49. The cam 49 is mounted on the shaft 50, and the rotation of the cam 49 is synchronized with the intermittent movement of the conveyor C so as to cause a container to drop into a waiting shell 24 during the dwell time of the conveyor. For a more complete description of the container dispenser and the operating mechanism therefor, reference may be made to the above-identified copending application.

The containers 25, in their preferred form, as best shown in Figure 13, have a tapered body, a substantially flat base and a rolled, or formed, lip about the mouth portion thereof. The containers are usually supplied stacked or nested in a suitable quantity for depositing in the magazine formed by the vertical rods 42. The containers, as mentioned above, are dispensed from the magazine one at a time into the shell 24 of the conveyor, and the conveyor is then advanced to deliver the empty container beneath the discharge nozzle M of the feeding apparatus F.

The feeding apparatus is fully described in the above-identified copending application and, inasmuch as it forms no part of the subject matter of the present invention, there is no necessity to describe it in detail herein. Suffice it to say, for purposes of this application, that the feeding apparatus F embodies a gear-type displacement unit which discharges a measured quantity of sherbet into the empty container. The gear-type displacement unit is driven by a drive transmission through a clutch 166 (shown in Figure 8).

After the filling operation, the filled container is transported by the conveyor to the closure-applying mechanism G for the application of a lid to the container. The lids or closures 69 (see Figure 11) preferably used are made of laminations of metal foil and paper, and the outer peripheries thereof are formed with a tapered, downwardly depending skirt. These lids or closures are supplied in nested fashion, and they are stacked in the magazines 61 of the closure-applying mechanism G in an inverted or upside down position.

The magazines 61 are mounted at their lower ends in a housing 89 supported by a horizontally disposed plate 246, and the lids or closures 60 are withdrawn therefrom and applied on the filled containers transported by the conveyor C by an assembly K which includes pivotal suction heads 81 (see Figures 13 and 17) mounted to a vertically reciprocating frame 65.

The reciprocating frame 65, as best shown in Figure 11, comprises a front plate 66 and a rear plate 67 fastened together by three tie bars 68. The front and rear plates 66, 67 are each provided with an upper vertical bearing 69 and a lower vertical bearing 70, permitting vertical movement of the frame 65 on guide bars 71 and 72. A reciprocating movement is imparted to this frame by the vertically disposed connecting rods 73 and 74 driven by crank arms 75 and 76 which are connected to the connecting rods 73 and 74 by pins 77 and 78, respectively. The crank arms 75 and 76 are attached at opposite ends of the rotatable shaft 50, and rotation is imparted to the shaft 50 by the motor driven chain 39 which drives the conveyor C intermittently. The movement of the frame 65 is thus synchronized with the conveyor so that the conveyor movement occurs during the time while the frame is in the upper half of its full stroke.

Figure 17:
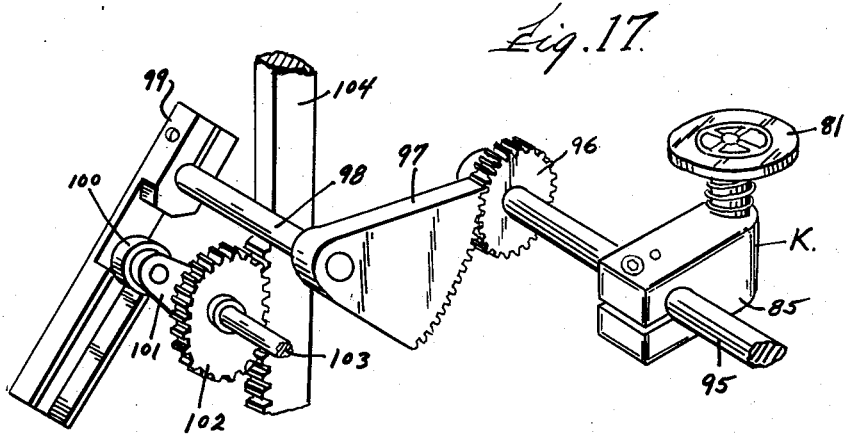
Figure 17 is a perspective view illustrating the suction head of the closure-applying mechanism and the operating parts therefor.

The assembly K, as best shown in Figures 13 and 17, comprises generally a reciprocated rock shaft 95, a pair of blocks 85 clamped thereon, and a suction head 81 resiliently mounted in each of the blocks 85. The head is provided with a hollow stem 83 which passes through a bearing in block 85, and the other end of the stem is provided with a cap 86 incorporating a suitable fitting for attaching a flexible tube 87. The face of the head 81 contains apertures which communicate with a vacuum system (not shown) via the hollow stem 83 and the tube 87.

As best shown in Figure 11, the lower end of the magazine 61 terminates in a mouthpiece 88 within the housing 89. During the upward movement of the frame 65, the head 81 is pivoted to its vertical upward position so that it may be received within the mouthpiece to engage and lift the lowermost lid therein. This action jogs the stack of lids to prevent a jam-up in the magazine; furthermore, it affords adequate time to establish suction between the face of the head 81 and the lid. When the head is withdrawn from the mouthpiece, the suction causes the lid to adhere thereto, permitting the lid to be withdrawn from the magazine. The shaft is pivoted during the downward travel of the frame 65 from an upward to downward position (shown in Figure 13) to apply the lid to the container. The vacuum is then cut off from the head. The head is raised away from the capped container as the frame 65 moves upwardly.

The pivotal reciprocation of the rock shaft 95 and the heads supported thereon is best described with reference to Figure 17. The shaft 95 is supported within bearings in the front and rear plates 66 and 67 of the frame 65.

As the frame 65 moves downwardly, the shaft 95 is caused to rotate through one-half a revolution, permitting position of the lid adhering to the head to be reversed prior to application to the container. This operation is accomplished by a drive mechanism which comprises gear 96 pinned to the shaft 95, a reciprocable segment 97 which meshes therewith, a rock shaft 98 on which the segment is mounted, a slotted arm 99 also mounted on the rock shaft 98, an arm 101 carrying a roller 100 which engages the slotted arm 99, a rock shaft 103 which supports the arm 101, a gear 102 mounted on the shaft 103, and a stationary rack 104 meshing with the gear 102.

The shaft 103 is rotatably mounted in a bearing in the rear plate 67 of the frame 65, and as the frame 65 moves upwardly and downwardly, the shaft 103 is reciprocated by the engagement of the gear 102 thereon with the stationary rack 104 which is fixed to the frame A of the machine. As the shaft 103 reciprocates, the roller 100 is translated in an arcuate path, during which movement it engages the slotted arm 99 causing the segment gear 97 to drive shaft gear 96. The open passageway at the opposite end of the slot in the arm 99 permits the roller 100 to escape engagement from the arm once the movement of shaft 95 has been accomplished.

Sealing of the lid or closure to the container is accomplished by the closure being placed on the container and forced downwardly into a sealing ring (see Figures 13 to 15). The sealing ring is formed by the semi-circular openings in a pair of pivotal arms 111. As the lid is forced downwardly, the skirt of the closure is forced in and under the lip portion of the container by the taper of the sealing ring.

As the lid or closure is applied to the container, the vacuum is released, and low-pressure air is applied to the face of the head 81 to prevent any sticking of the container to the head 81. The air and vacuum pressures are controlled by a conventional three-way valve 112 mounted to the plate 67 of the reciprocating frame 65, as best shown in Figures 2 and 11.

The conventional three-way valve 112 is controlled by a pair of push rods, one having upper and lower ends 113 and 114, and the other having upper and lower ends 115 and 116. As the reciprocating frame 65 moves upwardly, the engagement of the push rod 113 with a striker plate 117 causes vacuum to be applied to the suction heads 81 through the flexible tube 87. The vacuum is used in pulling the lids or closures through the mouthpiece 88. At the lower end of the stroke of the reciprocating frame 65, the three-way valve 112 is controlled by the engagement of the lower end of the push rod 114 with the plate 240 to cause the vacuum to be released, thereby resulting in the release of a lid from the head 81. This action is repeated for each cycle of the machine.

Each of the arms 111 comprising the sealing ring is attached to the vertically pivoted shafts 218, 219 and 224 operated by suitable mechanism, shown in Figure 14, which is synchronized with the movement of the closure-applying mechanism G. The arms 111 are pivoted to open position during the movement of the conveyor C. At the completion of the movement of the conveyor C, the arms 111 are pivoted to closed position, thereby engaging the container in position to have a lid applied thereto.

The mechanism for lifting the capped or closed containers from the conveyor shells 24 and depositing them on the rotatable turntable 143 is best shown in Figure 12. A suction head 121, attached to the lower end of a tube 122, is telescoped within an outer tube 123 which is clamped in place by blocks 126 and 127. The blocks 126 and 127 are attached by arms to the reciprocating frame 65, so that the suction heads 121 travel up and down with the frame 65. The mechanism is conventional and is described in the above-identified copending application. It may be mentioned herein, however, that when the reciprocating frame 65 is at the bottom of its movement, the suction heads 121 engage the upper surfaces of the lids of the sealed containers 25, and the containers are raised thereby during the upward movement of the frame 65. These arms are also movable to set the filled containers onto the turntable 143 during the reciprocation of the frame 65, but this operation is not relevant to the present invention. The establishment of the vacuum to the suction heads 121 and the disestablishment thereof are controlled by the rod 115, 116 during the reciprocation of the frame 65. As in the operation of the heads 81, a low pressure supply is placed in communication with the suction heads 121 to insure the release of the containers onto the turntable 143.

We turn now to the operation of the safety control system of the present invention, as best shown in Figure 8, for rendering inoperative the filling apparatus F and the lid-applying mechanism G during cycles in which a container is not delivered to a container-receiving shell of the conveyor A. As mentioned above, the filling apparatus is driven via an electromagnetic clutch 166, and the clutch 166 is engaged by an electrical circuit completed via a rectifier 165 when the switches 164 and 157 are closed. The switch 157 is normally closed but is adapted to be opened under certain conditions. The switch 164 is adapted to be closed by a rotatable cam 171 which maintains the switch 164 closed for approximately one-half of a cycle and open for the other one-half cycle. The cam 171 is synchronized with the rest of the machine so that the switch 164 is closed during the dwelling time of the conveyor. When the switches 164 and 157 are closed, the clutch becomes a rigid coupling, turning the gear displacement unit of the filling apparatus F and forcing the sherbet through the nozzles M into the containers.

Referring to Figure 8 of the drawings, a pivotal reciprocating container-detecting assembly 150 is positioned above each of the conveyors C between the container dispenser D and the filling apparatus F, and the position thereof controls the operation of a switch 151. The container-detecting assembly is adapted to be reciprocated by the engagement of a pin 152 therewith of the reciprocating link 45 described above in connection with the container dispenser D.

Whenever a container is present in a shell 24 leaving the dispenser D, the pivotal container-detecting assembly 150 engages the container and prevents the assembly 150 from being lowered far enough to close switch 151 as the rack 45 moves downwardly. However, if a container is missing when the shell 24 leaves the dispenser D, the container-detecting assembly 150 will be allowed to move downwardly far enough to close the switch 151, and the switch 151 closes a circuit to the solenoid 153 which operates in conjunction with the segment cams 155.

A series of segment cams 155 are arranged in circular array, as shown in Figure 8, and the cams are supported by individually slidable pins or stems 156 in a rotatable housing 154. The housing 154 is driven by a pawl and ratchet mechanism so that each cam 155 moves a distance equal to its length for each intermittent movement of the conveyor C. Roller operated switches 157 and 158 are mounted in a plane out of the path of movement of the cams 155 (see Figure 4) so that the cams 155 normally clear the switches 157 and 158. However, when the solenoid 153 is actuated by the failure of the container-detecting assembly 150 to encounter a container, it moves the link 161, raising roller 159 mounted on a pivotal arm 160, and the roller raises the segment cam 155 into the path of the rollers 162 and 163. The switch 157 is normally closed so that when the switch 164 is closed by the cam 171, the solenoid is energized to engage the clutch to operate the filling apparatus F. In the event a container is not positioned in the conveyor shell 24, the segment cam corresponding to the position of the empty container shell in the conveyor moves the roller 162 of switch 157 outwardly as the empty conveyor shell 24 moves to the filling station, opening the switch 157 to prevent the operation of the filling apparatus F during that cycle of operation.

The closing of the normally open switch 158 energizes the solenoid 167 to operate a push rod stop 117 associated with the three-way valve 112. As disclosed above, in normal operation, the rod 113, 114 is moved to raised position at the end of the downward stroke of the reciprocating frame 65. This movement of the rod 113, 114 breaks the suction to the head 81 to prevent the container from being raised during the upward stroke of the frame 65. The suction to the head 81 is restored at the end of the upward stroke of the frame 65 by the movement of the rod 113, 114 to downward position as a consequence of its engagement with the stop plate 117. Therefore, when the stop plate 117 is moved out of the path of the rod 113, 114, the suction to the head is not established during that cycle of operation and a lid will not be withdrawn from the magazine. When operative cam segment 155 moves out of engagement with the roller 163, the solenoid 167 is deenergized and the stop plate 117 is returned to operative position by spring pressure.

Once the segment cams 155 pass the rollers 162, 163, they are returned to their normal positions by a stationary cam 169 (see Figures 4 and 6).

The rotatable housing 154 which carries the segment cams 155 thereon and the mechanism associated therewith is mounted in a plate 200 which is secured to the front of the main frame A of the machine. As best shown in Figures 4 to 6, inclusive, a shaft 201 extends through a bushing 202 in the plate 200, and the shaft 201 is driven by the drive chain 39 to make one complete rotation for each cycle of the machine. A gear 203 (see Figure 7) is mounted on the shaft 201, and the gear 203 drives the gear 206 (see Figures 5 and 9), thereby rotating the cams 171 and 205 mounted coaxially with the gear 206. The gears 203 and 206 are in a one to one ratio, and the cams 171 and 205 operate switches 164 and 207, respectively. Furthermore, as best shown in Figure 7, the gear 203 imparts an oscillatory movement to pawl plate 210 by the action of the pin 208 and connecting link 209. The pawl plate 210 pivots about the stud 211, such action causing the pawl 212 to index the ratchet wheel 214 one step for each cycle of the machine. The ratchet wheel 214 is attached to the rotatable housing 154, and the number of teeth on the ratchet wheel is equal to the number of segment cams 155 carried by the housing 154.

As best shown in Figure 6, the stems 156 which support the cams 155 are slidably mounted in bearings 215 of the housing 154. The stems are provided with upper and lower grooves which, by means of a detent, permit a cam to be adjusted in the plane of the rollers 162, 163 (see Figure 8) or out of the plane thereof. The detent comprises balls 216 and a pressure spring 217 which forces the balls into one or the other groove of the stem 156 to properly position the cam.

As mentioned above, normally all of the cams 155 are located out of the path of the rollers 162 and 163. However, in the event of the absence of a container in one of the shells, the container-detecting assembly 150 is permitted to drop far enough to close switch 151, energizing the solenoid 153. When solenoid 153 is energized, its action is coupled to the pivot arm 160 through link 161, which moves the roller 159 into engagement with one of the cams 155. Said action forces the cam into a position to engage the rollers 162 and 163 to operate switches 157 and 158.

The driving action of the pawl 212 against the ratchet wheel 214 imparts intermittent rotation to the housing 154 and the segment cams 155 carried thereby, and said rotation is in synchronization with the intermittent movement imparted to the conveyor C. Because of the crank action of the rotating gear 203 and the connecting link 209, the angular displacement of the housing 154 is completed via the ratchet drive in approximately the first half of the operating cycle. This operation, of course, is synchronized so that dwell time between movements of the housing 154 occurs at the same time as the dwell time between movements of the conveyor C. In addition, the roller 162 is so positioned that it is approximately in the center of a cam 155 during the dwell period. Thus, in the event this cam has been raised to operating position due to the absence of a container in its corresponding conveyor position, switch 157 will be opened during the dwell. When switch 157 is open, as mentioned above, the electromagnetic clutch 166 is disengaged to render inoperative the filling apparatus F.

As the housing 154 rotates during the succeeding cycle of operation, the cam 155 in raised position will operate the switch 158, this movement occurring during the time the assembly K is moving upwardly. The raised cam moves against the roller 163, causing switch 158 to close, whereby a current is caused to flow to solenoid 167, pulling the plate 117 out of the way of the valve push rod 113, shown in Figure 11. The failure of the plate 117 to engage the push rod prevents a vacuum from being applied to the suction head 81, so that a lid is not withdrawn from the magazine 61. As the cam 155 passes into its next dwell position, switch 158 reopens, permitting the plate 117 to be reset to operative position. By controlling the vacuum in the above manner, the feeding of a lid is prevented to a shell in which no container is present.

As mentioned above, the switch 164 is opened and closed by cam 171. This cam is so set that the switch is closed during the dwell time of the conveyor C.

In the event that the magazine 61 should be empty, or a deformed lid should cause malfunction of the lid-applying mechanism, a number of filled containers would be fed to the lid-applying station, permitting the sherbet to be drawn into the vacuum system of the machine when the heads 81 are moved into contact with the filled containers. In order to prevent this, an additional safety system is provided to detect the absence of a lid on the head 81 and to stop the machine in this event.

As shown in Figure 10, an actuator 221 having a movable diaphragm 222 is coupled to the line 87, and the diaphragm is adapted to control the operation of a control switch 220. When the actuator is in communication with a vacuum, the position of the diaphragm 222 maintains the switch 220 closed. However, when the actuator is in communication with air pressure, the switch is held open.

A vacuum check switch 207, opened and closed by a cam 205, shown in Figure 10, parallels the switch 220. The cam 205 is shaped so as to open switch 207 momentarily, and the cam is set so that this occurs a short time after the head 81 leaves the mouth 88 of the magazine 61. If a lid is withdrawn by the head 81, the apparatus on the face thereof are sealed, and the vacuum maintains the switch 220 closed. If, however, no lid has been withdrawn from the magazine 61, the air drawn into the tube 87 opens the switch 220; thus, when the switch 207 opens, the relay 223 will be deenergized, breaking the circuit to the motor 255. When this occurs, the machine will coast to a stop in approximately one-half cycle, or at any rate before the head 81 comes into contact with the sherbet in the container.

By way of summary, the mechanism for applying and locking lids to the containers is shown in Figures 11, 12, 13, 14, 15 and 16. This mechanism consists of the vertically reciprocating frame 65 which carries the lid-receiving and applying assembly K, and the sealing rings formed by the arms 111 which may be pivoted to operative and inoperative positions. At the upper portion of the stroke of the reciprocating frame 65, the head 81 of the assembly K enters the lower end of the magazine 61. As the head 81 engages the lowermost lid in the magazine 61, a vacuum is applied thereto through the flexible tube 87 and the hollow stem 83, and as the frame 65 moves downwardly, a lid is withdrawn from the magazine 61 by the head 81. The mouthpiece 88 in the lower end of the magazine 61 retains the rest of the lids and permits only the lower one to be withdrawn. As the frame 65 moves downwardly, the assembly K is pivoted downwardly, and as the assembly K moves to the lower portion of its stroke, the lid is placed on the filled container and crimped thereon by the action of the sealing ring and the downward movement of the head 81. As mentioned above, the inner surface of the sealing ring has a taper which forces the skirt of the lid under the lip of the container, locking the lid in place on the container.

The sealing ring, as mentioned above, is formed by two semi-circular openings in the pivotal arms 111. As best shown in Figures 14 and 15, the arms 111 are attached to the pivot shafts 218, 219 and 224. The operation of the arms 111 is such that, as the conveyor moves from position to position, the arms are swung open to the positions indicated by the broken lines in Figure 15, and during the dwell time of the conveyor the arms are swung closed to the positions indicated by the solid lines in Figure 15, forming a circular ring which facilitates the sealing action described above.

Figure 16:
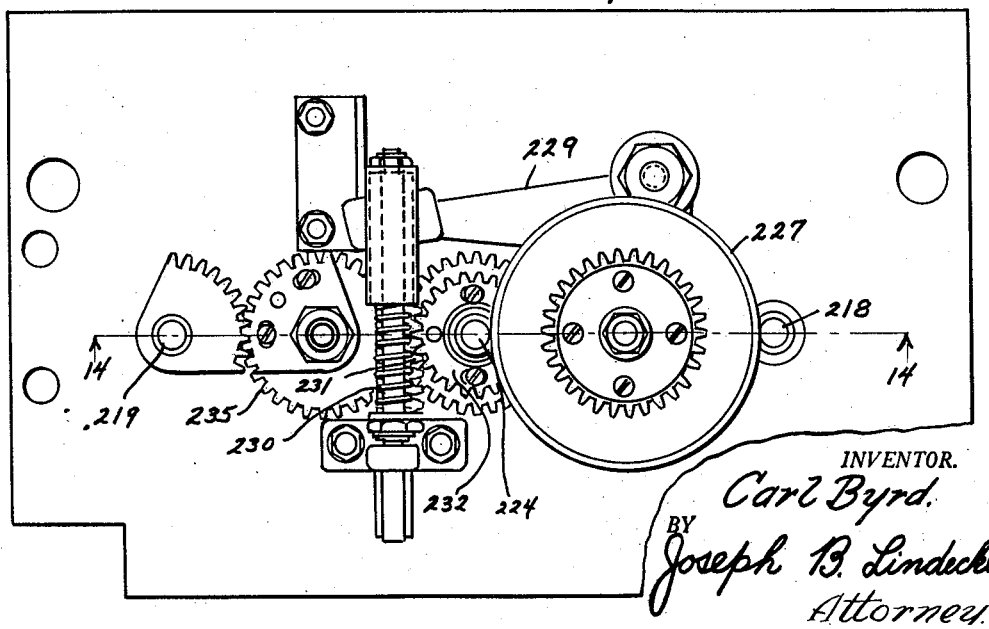
Figure 16 is a bottom view of the mechanism shown in Figure 14.

The mechanism to open and close the arms 111 is shown in Figures 14, 15 and 16. A set of helical gears 225 and 226, the latter being mounted on the main crankshaft 50 (see Figure 11) and the former being secured to cam 227, serves to drive the cam 227, which, in turn, operates this mechanism. A cam roller 228, mounted to an arm of a pivital bellcrank lever 229, rides in a groove in the upper face of the cam 227, and the other arm (see Figure 16) is coupled through a spring 230 to a rack 231. The rack 231 thus imparts a reciprocating rotation to a gear 232 which is pinned to the central pivot shaft 224. The shaft 219 is driven from the shaft 224 by a gear transmission which includes a gear affixed to the shaft 224, an intermediate gear 235 (see Figure 11), a gear segment 236 (see Figure 14) affixed to the gear 235 and a gear segment 238 affixed to the shaft 219. The shaft 218 is driven from the shaft 224 via an intermediate gear which meshes with a gear segment 237 affixed to the shaft 218.

The spring 230, coupling the arm of the bellcrank lever 229 to the rack 231, serves two purposes. Since the bellcrank lever 229 actually pivots through a greater angle than is necessary to bring the arms 111 into operative positions, the spring brings the semi-circular ring portions together under pressure, insuring tight matching of sealing ring portions, notwithstanding any backlash in the gear train operating the pivot shafts 218, 219 and 224. Further, in event of any obstruciton which might prevent the proper closing of the arms 111, the spring 230 will yield, permitting the bellcrank lever 229 to complete its stroke.

The components of this mechanism are mounted upon the base plate 240. The pivot shafts 218, 219 and 224 rotate in bearings 241 and 242 which are positioned in bearing housings 243. The pivot shafts are held in place when the arms 111 are removed by a spring clip ring 244 which snaps into a groove in the pivot shafts 218, 219 and 224, said ring resting against a washer 245 and supporting the entire assembly against the flange of the upper bearing 241 for the pivot shaft. The flats on the pivot shafts 218, 219 and 224 position the arms 111, permitting rapid changing of the arms 111 for different sizes of containers and lids.

The invention has been shown in preferred form only and by way of example, and obviously many variations and modifications may be made therein without departing from the spirit of the invention. The invention, therefore, is not to be limited to any specified form or embodiment except in so far as such limitations are set forth in the claims.

I claim:

1. In a machine for filling containers and applying closures to the filled containers: a frame structure; a power driving mechanism mounted upon said frame structure; an intermittently movable, endless conveyor driven by said power driving mechanism; a container magazine; a container-dispensing unit; a means for detecting the absence of a container upon said conveyor; a filling unit; a drive mechanism for said filling unit; an electric clutch for coupling the filler-driving mechanism with said filling unit; an electric control unit; said electric control unit having a cycling switch for controlling said electric clutch, whereby said filling unit dispenses material into a container during the dwell time between movements of the conveyor; a safety control system associated with said electric control unit; said safety control system actuated by said container-detecting means for controlling the opperation of said clutch, thereby preventing dispensing of material in the absence of a container at the filling station; a closure-applying and sealing unit; said closure-applying and sealing unit comprising a magazine for closures and a vacuum-type head; said head functioning to extract a closure from said magazine and to apply said closure to a filled container; said container-detecting means controlling said electric control unit for preventing extraction of a closure from said closure magazine in the absence of a container at the closure-applying and sealing station; a solenoid operated by said container-detecting means; means controlled by the solenoid for connecting a source of vacuum with said head; and a second electric control system comprising a pressure controlled switch, said pressure controlled switch operating in the event no closure is extracted from the magazine to render the power driving mechanism inoperative.

2. In a machine for filling containers and applying closure to the filled containers: a frame structure; a power driving mechanism mounted upon said frame structure; an intermittently movable, endless conveyor driven by said power driving mechanism; a magazine for containers; a unit for dispensing containers onto said conveyor; a means for detecting the absence of a container upon said conveyor; a filling unit; drive mechanism for said filling unit; an electric clutch for coupling the filler-driving mechanism with said filling unit; an electric control unit; said electric control unit having a cycling switch for controlling said electric clutch, whereby said filling unit dispenses material into a container during the dwell time between movements of said conveyor; a safety control system associated with said electric control unit; said safety control system being actuated by said container-detecting means for preventing dispensing of material in the absence of a container at the filling station; a closure-applying and sealing unit; said closure-applying and sealing unit comprising a magazine for closures and a vacuum-type reciprocating head; said reciprocating head functioning to extract a closure from the magazine and to apply the closure to a filled container; said container-detecting means connected with said electric control unit for preventing extraction of a closure from said closure magazine in the absence of a container at the closure-applying and sealing station; a solenoid operated by said container-detecting means; means controlled by the solenoid for connecting a source of vacuum with said reciprocating head; and a second electric control system comprising a pressure-type switch operable in the event a closure is not extracted to render the power driving mechanism inoperative.

3. A container-filling, closure-applying and sealing machine comprising, in combination: a container-dispensing mechanism, a container-filling mechanism and a closure-applying mechanism, all arranged in spaced relation; an intermittently driven conveyor for supporting thereon a succession of resiliently mounted pocket elements in spaced relation and transporting said pocket elements in operative relationship with said mechanisms; said pocket elements receiving and supporting a container released from the container-dispensing mechanism; a common power driving means for driving said conveyor and for actuating said container-dispensing, filling and closure-applying mechanisms; electric circuit control means; container-detecting means associated with said electric circuit control means to detect the absence of a container in one of said pocket elements; means controlled by said container-detecting means for rendering the filling mechanism inoperative in the absence of a container in one of said pocket elements; means controlled by said container-detecting means for rendering said closure-applying mechanism inoperative in the absence of a container in one of the pocket elements at said closure-applying and sealing station; a pair of power actuated jaws for engaging said filled containers positioned at said closure-applying mechanism; said jaws providing a forming die about the open end of the filled containers; a reciprocating head associated with said closure-applying mechanism for receiving a closure and applying it to the open end of the container; said head and said jaws cooperating to lock the closure onto the open end of the container; and a safety mechanism in combination with said electric circuit control means for rendering inoperative said power driving means in the event that a closure has not been received by the reciprocating head during any cycle of operation, thereby preventing the material within the open container from entering the vacuum system of the machine.

4. A container-filling, closure-applying and sealing machine comprising, in combination: mechanism providing a container-dispensing station, a container-filling station, and a container-closure-applying and sealing station, all arranged in spaced relation; a conveyor for supporting a succession of resiliently mounted pocket elements in spaced relation beneath said mechanism and for intermittently moving same to and past all of said stations; said pocket elements for receiving and supporting flexible containers; said containers having outturned flange portions around the mouth thereof; a common power driving means mounted upon the machine operable to move said conveyor and to actuate said container-dispensing station, said filling station, and said closure-applying and sealing station; means at the container-dispensing station actuated by said power driving means to dispense a container into each of said pocket elements; electric circuit control means, a safety mechanism associated with said electric circuit control means to detect the absence of a container in one of said pocket elements; said conveyor moving the containers in said pocket elements to said filling station; power operating means at said filling station for discharging material in measured quantities into the containers positioned at said filling station; said safety mechanism in combination with said electric circuit control means preventing the operation of the filling mechanism in the absence of a container in one of said pocket elements; said conveyor moving the filled containers to the closure-applying and sealing station; a plurality of closure magazines for holding stacks of closures; said safety mechanism in combination with said electric circuit control means preventing closures from being withdrawn from the closure magazines in the absence of a container in one of the pocket elements at said closure-applying and sealing station; a pair of horizontally power actuated jaws for contacting each of said filled containers positioned at said closure-applying and sealing station; said pair of jaws providing a forming die about the flange of each of said filled containers; a plurality of suction-type plunger means at said closure-applying and sealing station, movable toward and away from said magazines, to remove the end closure from each of said stacks and for applying said preformed closures with their dependent skirt portions about the flange portions of said filled containers; said plunger means having a resiliently mounted, free end mouthpiece; each of said plunger means causing a closure and a filled container to be moved downwardly, whereby said jaws seal said closure tightly about the flange portion of said container; a plurality of pneumatic means for removing sealed containers from said conveyor; and a safety mechanism in combination with said electric circuit control means stopping said power driving means mounted upon the machine in the event no closure has been withdrawn from any of the closure magazines for application to a filled container, thereby preventing the material within the uncapped container from entering the vacuum system of the machine.

5. A container-filling, closure-applying and sealing machine comprising, in combination: mechanism providing a container-dispensing station, a container-filling station and a container-closure-applying and sealing station, all arranged in spaced relation; a conveyor for supporting a succession of resiliently mounted pocket elements in spaced relation beneath said mechanism and for intermittently moving same to and past all of said stations; said pocket elements for receiving and supporting flexible containers; said containers having outturned flange portions around the mouth thereof; a common power driving means mounted upon the machine operative to move said conveyor and to actuate said container-dispensing station, said filling station and said closure-applying and sealing station; means at the container-dispensing station actuated by said power driving means to dispense a container into each of said pocket elements; electric circuit control means; a safety mechanism associated with said electric circuit control means to detect the absence of a container in one of said pocket elements; said conveyor moving the containers in said pocket elements to said filling station; power operating means at said filling station for discharging material in measured quantities into the containers positioned at said filling station; said safety mechanism in combination with said electric circuit control means preventing the operation of the filling mechanism in the absence of a container in one of said pocket elements, said conveyor moving the filled containers to the closure-applying and sealing station; a plurality of closure magazines for holding stacks of closures; said safety mechanism in combination with said electric circuit control means preventing closures from being withdrawn from the closure magazines in the absence of a container in one of the pocket elements at said closure-applying and sealing station; a pair of horizontally power actuated jaws for contacting each of said filled containers positioned at said closure-applying and sealing station; said pair of jaws providing a forming die about the flange of each of said filled containers; a plurality of suction-type plunger means located at said closure-applying and sealing station; said plunger means movable back and forth between said magazines and said jaws for withdrawing preformed closures from said magazines and for applying said preformed closures with their dependent skirt portions about the flange portions of said filled containers; said plunger means having a resiliently mounted, free end mouthpiece; said plunger means causing a closure and a filled container to be moved downwardly, whereby said jaws seal said closure tightly about the flange portion of said container; a plurality of pneumatic means for removing sealed containers from said conveyor; and a safety mechanism in combination with said electric circuit control means stopping said power driving means mounted upon the machine in the event no closure has been withdrawn from any of the closure magazines for application to a filled container, thereby preventing the material within the uncapped container from entering the vacuum system of the machine.

6. A filling, closure-applying and container-sealing machine comprising: a conveyor adapted for the support of flexible paper containers of cup-shape configuration; a common power driving means mounted upon the machine for imparting movement to said conveyor and other movable parts of said machine; a hopper adapted for the reception of semi-liquid sherbet to be deposited in the containers supported upon the conveyor; valve means for expelling the sherbet from said hopper to a plurality of filling nozzles; each of said filling nozzles terminating in a discharge extension arranged over said conveyor and the containers supported thereon; said valve means arranged between said hopper and said nozzles also for governing the quantity of said sherbet through said nozzles and into said paper containers disposed in registration with the discharge extensions of said nozzles; electric circuit control means; a safety mechanism associated wtih said electric circuit control means to detect the absence of a container on the conveyor as it moves to said filling nozzles; said conveyor moving said containers, after being filled, to a closure-applying and sealing station; a plurality of closure magazines for holding stacks of closures; vacuum-type plunger means movable back and forth between said magazines and said containers upon the conveyor for applying closures upon said containers; a pair of horizontally power actuated jaws for contacting each of said filled paper containers with a closure applied thereon; said pair of jaws providing a forming die about the mouth portion of each of said containers; said jaws combined with said vacuum-type plunger means for sealing said closure tightly about the mouth and flange portion of said flexible paper container; and a safety mechanism associated with said electric circuit control means stopping said common power driving means in the event no closure has been withdrawn from any of the closure magazines for application to a filled container, thereby preventing the material within the uncapped container from entering the vacuum system of the machine.

7. In a machine of the character described: an intermittently movable conveyor; a container-dispensing station; a filling station; a closure-dispensing and applying station; said stations arranged at substantial distances apart; said conveyor having container-supporting shells assembled therewith; an electric circuit control means; means for depositing flexible, cavity-containing containers into said shells in registration therewith and during the dwell time of said conveyor; power means mounted upon the machine for moving said conveyor and other movable parts of the machine; said power means moving said containers to said filling station; said filling station embodying a hopper adapted for the reception of semi-liquid, food-filling material to be deposited in the cavities of said containers; a chamber attached to said hopper; said chamber enclosing dispensing means for dispensing said food-filling material from said hopper; a plurality of discharge nozzles assembled with said chamber for conveying said food above said containers supported upon said conveyor and in registration therewith; said dispensing means being power controlled for delivering a quantity of food into each of said containers for domestic consumption; said containers forming the sole supporting means for said food during transportation and delivery to the ultimate consumer; a safety mechanism associated with said electric circuit control means to detect the absence of a container in one of said container-supporting shells; said conveyor intermittently moving said containers to a closure-dispensing and closure-applying station; a plurality of vacuum-type plunger means for withdrawing closures from a suitable supply chamber and for applying said closures upon the containers disposed in registration therewith; a pair of horizontally power actuated jaws arranged for contacting each of said containers having a closure thereon; said jaws providing a forming die about the flange portion of each of the containers; said jaws combined with said plunger means for sealing said closures tightly about the mouth and flange portions of said containers; a plurality of pneumatic means for removing sealed containers from said conveyor; and a safety mechanism associated with said electric circuit control means stopping said power means mounted upon the machine in the event no closure has been withdrawn from the closure supply chamber for application to a filled container, thereby preventing the food-filling material within the uncapped container from entering the vacuum system of the machine.

8. In a machine for filling containers and applying closures to the filled containers: a common power driving means; an electric circuit control means; a plurality of commodity-delivering nozzles; a horizontally, intermittently movable conveyor having a series of supporting members assembled thereon for supporting empty containers; said intermittently movable conveyor carrying the containers successively to filling position beneath said nozzles; a hopper communicating with said nozzles for the storage of the substance to be introduced into the empty containers; means for controlling the discharge of said substance from the hopper through said nozzles; means interposed in the path of travel of the container to detect the absence of a container in one of said supporting members of said conveyor; a rotor for storing information therein responsive to the detection of the absence of a container in one of said supporting members by said means interposed in the path of travel of the container; and means controlled by said rotor after a predetermined time delay for rendering inoperative the means for controlling the discharge of the substance from the hopper during a cycle of operation in which an empty container is not presented to the commodity-delivering nozzles, thereby preventing said food-filling material from being dispensed from said nozzles.

9. In an apparatus for filling containers and applying closures thereto: a container-dispensing mechanism, a filling mechanism and a closure-applying and sealing mechanism; the closure-applying mechanism including a reciprocating head for receiving a closure and applying it to a container; a power driving means; electric circuit control means; a safety mechanism associated with said electric circuit control means for detecting the absence of a container delivered to said filling mechanism; and a safety mechanism assocated with said electric circuit control means for detecting the failure of the reciprocating head to receive a closure; said safety mechanism and said electric circuit control means rendering inoperative said closure-applying mechanism in the event the reciprocating head fails to receive a closure during a cycle of operation.

10. A machine for filling containers and applying closures thereto: a power driving means; mechanism for dispensing flexible containers upon a movable conveyor; said conveyor moving said containers to a filling station; electric circuit control means; means for filling said containers; a safety mechanism associated with said electric circuit control means to detect the absence of a container on said conveyor; said conveyor moving said filled containers to a closure-applying mechanism; said closure-applying mechanism including a magazine for storing closures and reciprocating pneumatic means automatically controlled and operable in accordance with the movement of said containers, whereby each container received a closure from said magazine; said pneumatic means moving back and forth between said closure magazine and the containers upon the conveyor at said closure-applying station; a pair of power operated jaws for sealing a closure on each of said containers; and a safety mechanism in combination with said electric circuit control means for rendering inoperative said power driving means mounted upon the machine in the event no closure has been withdrawn from the closure magazine for application to a filled container, thereby preventing the material within the open container from entering the vacuum system of the machine.

11. In a machine wherein unfilled containers are delivered to a filling apparatus, a container detector for detecting the presence of a container delivered to the filling apparatus, a rotor, a plurality of actuators carried by the rotor, means for driving the rotor in synchronism with the feed of the containers to the filling apparatus, means for displacing said actuators to inopertive position, means controlled by the container detector for displacing one of said actuators to operative position, and means engageable with said displaced actuator as the rotor is driven for rendering the filling apparatus inoperative during the cycle of operation in which a container is not presented to the filling apparatus.

12. A machine as set forth in claim 11 including a closure-applying apparatus to which the filled containers are delivered after the filling operation, and means engageable with said actuator displaced to operative position for rendering the closure-applying apparatus inoperative.

13. In a machine wherein filled containers are delivered to a filling apparatus and then to a closure-applying apparatus, a container detector for detecting the presence of a container delivered to the closure-applying apparatus, a rotor driven in synchronism with the feed of containers to the closure-applying apparatus, a plurality of individually displaceable actuators carried by the rotor, means controlled by the failure of the container detecting means to detect the presence of a container delivered to the closure-applying apparatus for displacing one of said actuators to operative position, and means engageable with said actuator displaced to operative position as the rotor is driven for rendering the closure-applying mechanism inoperative during the cycle of operation in which a container is not presented to the closure-applying apparatus.

14. In a machine wherein unfilled containers are delivered to a filling apparatus in predetermined positions on a moving conveyor, a container-detecting means for detecting the presence of a container in a predetermined position on the conveyor, a rotor driven in synchronism with the movement of the conveyor, a plurality of individually displaceable cam segments carried by the rotor, means controlled by the failure of the container-detecting means to detect the presence of a container in a predetermined position on the conveyor for displacing one of said cam segments to an operative position, and means engageable with said cam segment displaced to operaive position for rendering the filling apparatus inoperative during a cycle of its operation in which a container is not presented thereto.

15. In a machine wherein unfilled containers are delivered to a filling apparatus and then to a closure-applying apparatus, a magazine for storing a plurality of closures, a reciprocating suction head for withdrawing a closure from the magazine and applying it to a filled container, means for establishing a suction to the reciprocating head to effect the withdrawal of a closure from the magazine, jaws movable toward and away from a container in timed relation with the reciprocation of the suction head, said jaws moving toward the open end of the container to form a die about the mouth portion of the container during the closure-applying operation, said jaws cooperating with the suction head for applying the closures tightly on the container, means for breaking the suction when the closure is applied to the container, drive means for imparting reciprocation to the head, and a pressure controlled actuator for rendering the drive means inoperative when suction is not established between the head and a closure adhering thereto.

16. In a machine wherein filled containers are delivered to a closure-applying apparatus, a magazine for storing a plurality of closures therein, each of said closures having a skirt forming its outer periphery to facilitate the application of the closure to the open end or mouth of a container, a reciprocating suction head for withdrawing a closure from the magazine and applying it to a filled container, a conveyor for transporting the filled container to the closure-applying apparatus, an annular split ring forming die which cooperates with said reciprocating suction head for applying said closures tightly on said containers, an inwardly sloped camming surface formed in the inner periphery of said die for turning inwardly the skirt forming the outer periphery of said closure beneath the mouth of the container, and means for forming the split ring forming die about the upper end of the container before the closure is applied to the container.

17. In a machine wherein filled containers are delivered to a closure-applying apparatus, a magazine for storing a plurality of closures therein, a reciprocating suction head for withdrawing a closure from the magazine and applying it to a filled container, a plurality of power actuated jaw segments movable toward each other during the closure-applying operation and away from each other after the closure-applying operation, said jaw segments when in operative position providing an annular forming die about the upper edge of the containers and cooperating with said reciprocating suction head for sealing a closure tightly on said container, and means for bringing the jaw segments together to form the annular die about the upper end of the container before the closure is applied to the container.

18. A machine as set forth in claim 17 wherein each of the jaw segments carries an inwardly sloped camming surface so that when all of said jaw segments are in operative position said jaws form a continuous camming surface surrounding the upper open end of said container.

19. A container-filling, closure-applying and sealing machine comprising, in combination, mechanism providing a container-dispensing station, a container-filling station and a container closure-applying and sealing station all arranged in spaced relation, a driven conveyor for supporting a succession of resiliently mounted pocket elements in spaced relation beneath said mechanism and for intermittently moving same to and past said stations, said pocket elements for receiving and supporting flexible containers, said containers having outturned flange portions around the mouth thereof, means at the container-dispensing station to dispense a container into each of said pocket elements, said container in said pocket element being moved to said filling station by said conveyor, power driven means at said filling station for discharging material in measured quantities into the container positioned at said filling station, said filled container moved to said closure-applying and sealing station by said conveyor, a pair of horizontally power-actuated jaws for contacting said filled container positioned at said closure-applying and sealing station, said jaws providing a forming die about the flange of said filled container, and plunger means at said closure-applying station for withdrawing a preformed closure from its source of supply and for applying said preformed closure with its dependent skirt portion about the flange portion of said filled container, said plunger means having a resiliently mounted free end mouthpiece, said plunger means causing said closure and said filled container to be moved downwardly, whereby said jaws seal said closure tightly about the flange portion of said container.

20. A container-filling, closure-applying and sealing machine comprising, in combination, mechanism providing a container-dispensing station, a container-filling station and a container closure-applying and sealing station all arranged in spaced relation, a conveyor for supporting a succession of container pockets in spaced relation beneath said mechanism and for intermittently moving same to and past said stations, said container pockets for receiving and supporting flexible containers, said containers having outturned flange portions around the mouth thereof, a common power-driving means assembled with the machine operable to move said conveyor and to actuate said mechanisms of said container-dispensing station, said filling station and said closure-applying and sealing station, means at the container-dispensing station actuated by said power-driving means to dispense a container into each of said pockets, said container in said pocket moved to said filling station by said conveyor, power-operating means at said filling station for discharging material in measured quantities into the container positioned at said filling station, said filled containers moved to said closure-applying and sealing station by said conveyor, a pair of horizontally power-actuated jaws for contacting said filled container positioned at said closure-applying and sealing station, said jaws providing a forming die about the flange of said filled container, and vacuum-type plunger means at said closure-applying station for withdrawing preformed closure from its source of supply and for applying said preformed closure with its dependent skirt portion about the flange portion of said container, said plunger means causing said closure and said filled container to be moved downwardly, whereby said jaws seal said closure tightly about the flange portion of said container.

21. A container-filling, closure-applying and sealing machine comprising, in combination, mechanism providing a container-dispensing station, a filling station and a container closure-applying and sealing station all arranged in spaced relation, a conveyor for supporting a succession of pockets in spaced relation beneath said mechanism and for intermittently moving same to and past said stations, said pockets for receiving and supporting flexible paper containers, said containers having outturned flange portions around the mouth thereof, a common power-driving means assembled with the machine operable to move said conveyor and to actuate said mechanisms of said container-dispensing station, said filling station and said closure-applying and sealing station, means at the container-dispensing station actuated by said power-driving means to dispense a paper container into each of said pockets, said paper container in said pockets moved to said filling station by said conveyor, power-operating means at said filling station for discharging material in measured quantities into the paper container positioned at said filling station, said filled paper container moved to said closure-applying and sealing station by said conveyor, a pair of horizontally power-actuated jaws for contacting said filled paper container positioned at said closure-applying and sealing station, said jaws providing a forming die about the flange of said filled paper container, and vacuum-type plunger means at said closure-applying station for withdrawing a preformed closure from its source of supply and for applying said preformed closure with its dependent skirt portion about the flange portion of said paper container, said jaws sealing said closure tightly about the flange portion of said container.

22. A filling, closure-applying and sealing machine comprising a conveyor adapted for the support of flexible paper cavity-containing containers of cup-shape configuration, means for imparting intermittent movement to said conveyor, a hopper adapted for the reception of semi-liquid sherbet to be deposited in the cavities of the containers supported upon the conveyor, means for expelling the sherbet from said hopper to filling nozzles, said filling nozzles leading from said hopper for conveying the sherbet, said nozzles terminating in a discharge extension arranged over said conveyor and the containers supported thereon, said sherbet expelling means arranged between said hopper and said nozzles also for governing the quantity and discharge of said sherbet through said nozzles and into said paper containers disposed in registration with the discharge extensions of said nozzles, said conveyor moving said filled containers to a closure-applying station, and vacuum-type plunger means for applying closures upon said containers, a pair of horizontally power-actuated jaws for contacting each of said filled paper containers and closure applied thereon, said jaws providing a forming die about the mouth portion of said container, said jaws combined with said vacuum-type plunger means for sealing said closure tightly about the mouth and flange portion of said paper container.

23. In a machine of the character described, a movable conveyor having a container-dispensing station, a filling station, and a closure-dispensing and applying station arranged at substantial distances apart and thereabove, said conveyor having container-supporting shells assembled thereto, means for depositing flexible cavity-containing containers within said conveyor shells in registration therewith, power means for moving said conveyor and said containers to said filling station, said filling station embodying a hopper adapted for the reception of semi-liquid food-filling material to be deposited in the cavities of said containers, a chamber attached to said hopper enclosing food-filling dispensing means for dispensing said food from said hopper, a plurality of discharge nozzles assembled with said chamber for conveying said food above said containers supported upon said conveyor and in registration therewith, said dispensing means power-controlled to deliver a quantity of food suitable for domestic consumption within each container, which forms the sole supporting means for said food during transportation and delivery to the ultimate consumer, said conveyor moving said containers to a closure-applying station, a plurality of vacuum-type plunger means withdrawing closures from a suitable supply chamber for applying said closures upon the containers disposed in registration therewith, and a pair of horizontally power-actuated jaws arranged for contacting each container having a closure thereon, said jaws providing forming dies about the flange portions of the containers, said jaws combined with said plunger means for sealing said closure tightly about the mouth and flange portion of said container.

References Cited in the file of this patent
UNITED STATES PATENTS

| | | |
|---|---|---|
| 1,765,030 | Pease | June 17, 1930 |
| 1,861,551 | Remillard | June 7, 1932 |
| 1,874,353 | Ross | Aug. 30, 1932 |
| 1,919,060 | Harden | July 18, 1933 |
| 2,355,385 | Lowry | Aug. 8, 1944 |
| 2,643,883 | Hogeberg | June 20, 1953 |
| 2,689,677 | Unger | Sept. 21, 1954 |
| 2,699,281 | Duke | Jan. 11, 1955 |

UNITED STATES PATENT OFFICE

CERTIFICATE OF CORRECTION

Patent No. 2,897,643                          August 4, 1959

Carl Byrd

It is hereby certified that error appears in the printed specification of the above numbered patent requiring correction and that the said Letters Patent should read as corrected below.

Column 4, line 13, for "69" read -- 60 --; column 8, line 59, for "apparatus" read -- apertures --; column 9, line 36, for "pivital" read -- pivotal --; column 13, line 18, for "wtih" read -- with --; column 18, line 62, list of references cited, for "June 20, 1953" read -- June 30, 1953 --.

Signed and sealed this 23rd day of February 1960.

(SEAL)
Attest:

KARL H. AXLINE                                    ROBERT C. WATSON
Attesting Officer                                  Commissioner of Patents